UNITED STATES PATENT OFFICE.

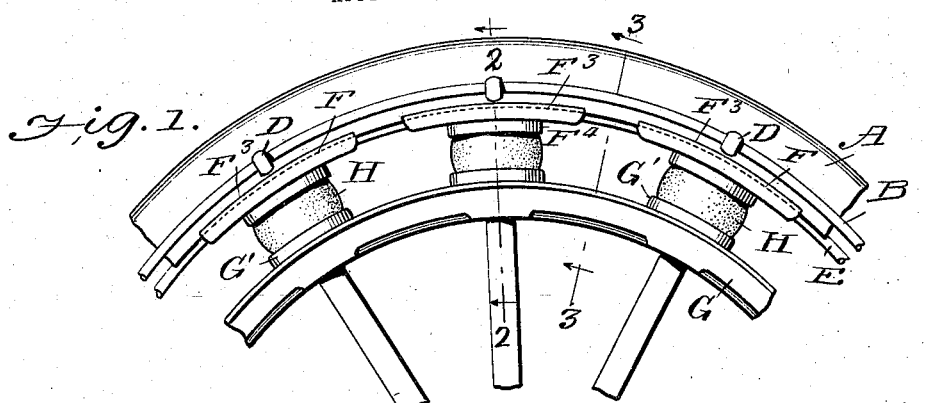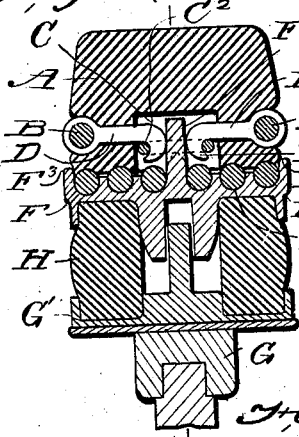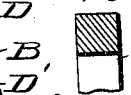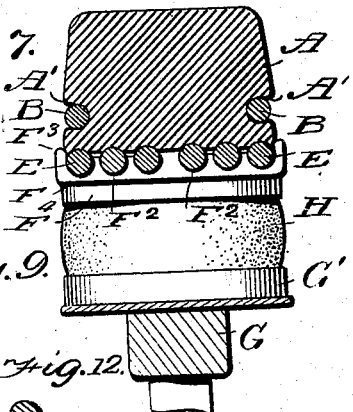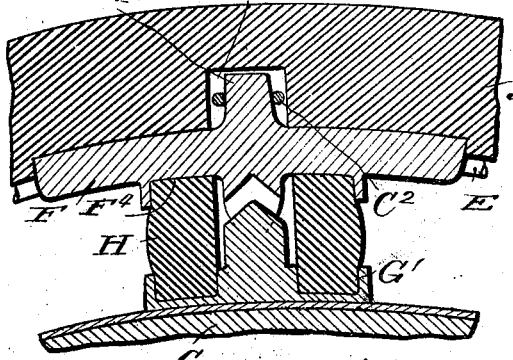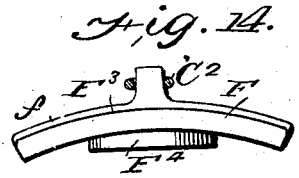

ISAAC W. GILES, OF NEW BEDFORD, AND CHARLES W. TOBEY, OF FAIRHAVEN, MASSACHUSETTS.

WHEEL.

No. 853,687.

Specification of Letters Patent.

Patented May 14, 1907.

Application filed November 8, 1906. Serial No. 342,557.

*To all whom it may concern:*

Be it known that we, ISAAC W. GILES, of New Bedford, in the county of Bristol and State of Massachusetts, and CHARLES W. TOBEY, of Fairhaven, in the county of Bristol and State of Massachusetts, have invented certain new and useful Improvements in Wheels, of which the following is a specification.

This invention is an improvement in the tire construction of wheels, and consists in certain novel constructions and combinations of parts as will be hereinafter described and claimed.

In the drawing Figure 1 is a side view of a portion of a wheel embodying my invention. Fig. 2 is a cross-section on about the line 2—2 of Fig. 1. Fig. 3 is a cross-section on about the line 3—3 of Fig. 1. Fig. 4 is a section on about the line 4—4 of Fig. 2. Fig. 5 is a plan view of one of the grooved supporting plates. Figs. 6 to 12, inclusive, show different cross-sectional forms of the rings constituting the supporting tire. Fig. 13 is a detail view showing the connection between the inner ends of the opposite studs, and Fig. 14 illustrates in side view one of the grooved supporting plates.

In carrying out our invention we employ an elastic tire A which may be of solid rubber, and is provided along its opposite sides with circumferential grooves A' receiving the reinforcing rings B, and in its inner circumference with a series of cavities C which are spaced apart around the circumference of the elastic tire and receive devices presently described. The reinforcing rings B are rods or stout wires in the form of rings and to these reinforcing rings are connected at intervals studs D arranged opposite the cavities C and extending through the outer portions of the tire A into the cavities C and having at their inner ends, within said cavities, hooks D' which are connected, within the cavities C, by links C², as best shown in Figs. 2 and 13 of the drawing.

For supporting the elastic tire we employ a supporting tire arranged within the inner circumference of the elastic tire comprising a plurality of rings E in the form of rods or stout wires which are concentric, but preferably of uniform diameter and are spaced apart laterally so they may yield independently and individually to pressure upon the elastic tire within the inner circumference of which they bear, as shown in Figs. 1 to 4. These rings E it will be understood are resilient and may be of any suitable cross-sectional form, as will be understood from the drawing in which in Figs. 2 and 3 the rings E are shown circular in cross-section and in Figs. 6 to 12 inclusive, different forms are illustrated. These rings E while operating to extend and support the elastic tire yield independently as pressure may be applied to the elastic tire, they being fitted tightly thereto and having a tendency to bed into the rubber of the elastic tire and thus aid in keeping the said elastic tire from lateral displacement. We have shown six rings but manifestly the number may vary and would depend more or less upon the width of the elastic tire. In practice after joining the ends of the rods to form the rings E, we find it desirable to roll the rings after joining them to produce a uniform temper.

Within the supporting tire we arrange at intervals supporting plates F which are provided on their outer sides with lugs F' opposite the cavities C and extending thereinto and within the links C², as best shown in Figs. 2 and 13 of the drawing. These supporting plates F bear within the inner circumference of the supporting tire and are provided in their outer faces with grooves F² extending in the direction of the circumference of the wheel and receiving the rings E of the supporting tire, and we also provide the said plates at their opposite edges with outwardly projecting flanges F³ which lap along the outer sides of the elastic tires A and aid in preventing lateral displacement of said tires as best shown in Figs. 2 and 3 of the drawing.

In practice we support the plates F from a rim G by means of elastic blocks H seated at their outer ends in sockets F⁴ on the inner sides of the plates F and at their inner ends in sockets G' upon the outer side of the rim G as will be understood from Figs. 1 to 4 of the drawing.

It will be noticed that the supporting plates F are provided midway between their sides with a longitudinal rib *f* which bedding into the elastic tire aids in preventing side slipping while the grooves in the said plates keep the rings or hoops in position. It will also be noticed that the lugs F' project within the links C² locking the hooks D' in engagement with the said links, said lugs F' by engagement with the links of the tire fastening device also operating to prevent any creeping of the elastic tire.

The construction of the tire fastening devices with the lugs and the links connecting the hooks at the inner ends thereof is such as to provide a flexible construction, which is desirable because of its coöperation with the independent rings of the supporting tire, the flexibility of the stud connection coöperating with the independent yielding of the rings of such supporting tire in securing the desired flexibility of the wheel. It will also be noticed that the sectional ring construction of the supporting tire operates in connection with the supporting plates and cushioning devices, for extending said supporting plates toward securing the desired flexibility of the wheel before referred to.

What we claim is—

1. The combination of an elastic tire provided in its inner side with a series of cavities at intervals, reinforcing rings of rod or stout wire extending along the opposite sides of the elastic tire, studs connected with the said side rings at points opposite the cavities in the elastic tire and extending thence into said cavities, connecting means between the inner ends of said studs, plates arranged within the inner circumference of the elastic tire and provided with lugs projecting into the cavities therein and engaging with the connecting means between the opposite studs, and a supporting tire consisting of independent rings extending between the elastic tire and the said plates, substantially as set forth.

2. The combination of an elastic tire, a supporting tire within the inner circumference of the elastic tire and consisting of a plurality of independent rings in the form of rods spaced apart laterally whereby they may individually yield to pressure upon the elastic tire, and supporting plates arranged at intervals within the supporting tire and each having grooves extending in the direction of the circumference of the wheel to receive the independent rings of the supporting tire, substantially as set forth.

3. The combination of an elastic tire and a tire within the inner circumference of and supporting said elastic tire, said supporting tire consisting of a plurality of annular rods independent of each other whereby they may yield individually to pressure upon the elastic tire, and means for supporting these annular rods at intervals throughout their circumference, substantially as set forth.

4. A wheel comprising an elastic tire, a supporting tire within the elastic tire and bearing against the inner circumference thereof and composed of a plurality of concentric independent rods whereby they may individually yield to pressure of the elastic tire, and supporting plates at intervals within the circumference of said supporting tire and each having grooves receiving the independent rings thereof, substantially as set forth.

5. A wheel comprising an elastic tire, a supporting tire bearing against the inner circumference of the elastic tire, and consisting of a plurality of independent rods in the form of rings, adapted to yield independently to pressure upon the elastic tire, plates supporting said rings at intervals, devices projecting outwardly from said plates between the rings of the supporting tire into the elastic tire, and intermediate devices between said outwardly projecting devices and the elastic tire, substantially as set forth.

6. A wheel comprising an outer tire, a supporting tire within the outer tire, and consisting of a plurality of independent rods in the form of rings, and plates supporting said rings and arranged at intervals within the circumference thereof and spaced apart to permit the rings to operate elastically between the said supporting plates, and means for supporting the said plates.

7. The combination of an elastic tire provided in its inner circumference with cavities arranged at intervals, supporting rings extending along the opposite sides thereof, studs connected at their outer ends with the said rings opposite the cavities in the tire and extending thence inwardly into the said cavities and provided at their inner ends with hooks within said cavities, and links connecting the inner ends of the opposite studs, substantially as set forth.

8. The combination in a wheel, substantially as described, of an elastic tire, a supporting tire within the inner circumference of the elastic tire and consisting of a plurality of independent rings and supporting plates arranged at intervals within the said supporting tire and provided with grooves receiving the rings thereof and having at their outer edges flanges lapping along the outer sides of the elastic tire, substantially as set forth.

9. An elastic tire extended from its inner circumference by a plurality of hoops or rings partially embedded in the inner circumference of the elastic tire whereby to prevent lateral displacement, plates supporting said rings or hoops, an inner rim, and cushions between the inner rim and the said plates to press the latter outwardly, substantially as set forth.

10. A wheel comprising an elastic tire, a supporting tire bearing against the inner circumference of the elastic tire and consisting of a plurality of independent rods in the form of rings adapted to yield independently to pressure upon the elastic tire and cushioning supporting devices within said supporting tire whereby to permit the independent yielding of the rings thereof, substantially as set forth.

11. A wheel comprising an elastic tire, a fastening therefor having rings bearing against the opposite sides of the elastic tire and studs extending inwardly from said rings, links connecting the inner adjacent ends of the opposite studs, a supporting tire consisting of a plurality of independent rods in the form of rings adapted to yield independently to pressure upon the elastic tire and supporting plates bearing against the inner circumference of the supporting tire and having lugs extending into the connecting links of the tire fastening device, substantially as set forth.

12. A wheel comprising an elastic tire, rings extending along the opposite sides thereof, studs connected at their outer ends with said rings and extending thence inwardly within the tire and provided at their inner adjacent ends with hooks, links engaged by the hooks of the opposite studs, and lugs extending within the links and locking the hooks in engagement therewith, substantially as set forth.

13. A wheel having an elastic tire provided in its inner circumference with cavities arranged at intervals, rings extending along the opposite sides of said tire, studs connected with said rings opposite the cavities in the tire and extending inwardly into said cavities and provided at their ends with hooks, links connecting the hooks of the opposite studs, a supporting tire within the elastic tire and consisting of a plurality of rings or hooks, and supporting plates within the supporting tire and having grooves receiving the rings thereof and provided with outwardly projecting studs entering the links connecting the opposite hook studs, substantially as set forth.

14. A wheel having an outer tire, a supporting tire within the outer tire, and consisting of a plurality of independent rings arranged laterally to each other, and adapted to yield individually to pressure upon the outer tire, supporting plates at intervals within the supporting tire, and spaced apart in the direction of the circumference of the wheel, and independent cushioning devices supporting said plates, substantially as set forth.

15. A wheel having an outer tire, a supporting tire within the outer tire and consisting of a plurality of independent rings arranged laterally to each other and adapted to yield individually to pressure upon the outer tire, supporting plates at intervals within the supporting tire and cushioning devices for said supporting plates, substantially as set forth.

ISAAC W. GILES.
CHARLES W. TOBEY.

Witnesses:
ROBERT BETAGH,
FRANK L. DAVIS.